United States Patent [19]

Ohzora et al.

[11] Patent Number: 4,808,275
[45] Date of Patent: Feb. 28, 1989

[54] METHOD FOR FORMING CORROSION RESISTANT COATING ON A DISC BRAKE

[75] Inventors: Takashi Ohzora, Tokyo; Yoshio Otsuka, Yamato; Kazuo Hoshino, Isehara, all of Japan

[73] Assignee: Nissan Motor Co., Ltd., Yokohama, Japan

[21] Appl. No.: 117,897

[22] Filed: Nov. 2, 1987

Related U.S. Application Data

[63] Continuation of Ser. No. 843,750, Mar. 25, 1986, abandoned.

[30] Foreign Application Priority Data

Mar. 26, 1985 [JP] Japan ................... 60-59366

[51] Int. Cl.⁴ ................. C25D 5/02; F16D 65/10; B32B 15/02
[52] U.S. Cl. ................. 204/16; 29/527.3; 29/DIG. 12; 188/218 XL; 188/251 M; 428/564
[58] Field of Search ......... 188/18 A, 218 XL, 251 M; 192/107 C, 107 M; 301/6 E, 6 WB; 29/DIG. 12, 527.2, 527.3, 527.4; 204/16, 9, DIG. 7; 428/564, 552; 295/33

[56] References Cited

U.S. PATENT DOCUMENTS

| | | | |
|---|---|---|---|
| 2,372,567 | 3/1945 | Graham et al. | 204/DIG. 7 X |
| 3,061,525 | 10/1962 | Grazen | 204/9 |
| 3,909,252 | 9/1975 | Kurijama et al. | 420/102 X |
| 4,290,510 | 9/1981 | Warren | 188/218 XL |
| 4,655,882 | 4/1987 | Hiromatsu et al. | 204/16 |

FOREIGN PATENT DOCUMENTS

| | | | |
|---|---|---|---|
| 2133487 | 1/1973 | Fed. Rep. of Germany | 188/251 M |
| 0005371 | 1/1978 | Japan | 188/251 M |
| 60-34532 | 2/1985 | Japan | |
| 0429206 | 2/1934 | United Kingdom | 204/DIG. 7 |
| 0640963 | 8/1950 | United Kingdom | 188/251 M |

Primary Examiner—Andres Kashnikow
Assistant Examiner—Robert J. Oberleitner
Attorney, Agent, or Firm—Foley & Lardner, Schwartz, Jeffery, Schwaab, Mack, Blumenthal & Evans

[57] ABSTRACT

A rotor of a disc brake is coated with a nickel coating containing ceramic particles in a dispersed state and having a thickness not less than 2 μm, thereby improving corrosion resistance while minimizing torque fluctuation of the rotor during braking. The nickel coating is formed on the surface of the rotor by composite plating in which nickel and the ceramic particles are simultaneously electrodeposited on the surface of the rotor. An annular jig surrounding the outer periphery of the rotor is used to insure a uniform coating thickness.

12 Claims, 4 Drawing Sheets

METHOD FOR FORMING CORROSION RESISTANT COATING ON A DISC BRAKE

This application is a continuation of application Ser. No. 843,750, filed Mar. 25, 1986, now abandoned.

BACKGROUND OF THE INVENTION

1. Field of the Invention

The present invention relates generally to a disc brake as a braking device for automotive vehicles and motorcycles, and more particularly to an improvement in a rotor or disc of the disc brakes.

2. Description of the Prior Art

For example, in the event that vehicles such as automotive vehicles and motorcycles are exported to a foreign country via a sea route, the vehicles assembled in a factory are first stored in a storage place near a loading port and next loaded onto a transport ship which travels to the foreign country which imports the vehicles. When they reach the foreign country, the vehicles are again stored in a storage place near an unloading port and thereafter are handed over to customers or users.

However, in the case where disc brakes are employed in the above-mentioned vehicles, the rotor of the disc brakes may be rusted for the following reasons: (1) The disc brake rotor is usually made of a ferrous metal; (2) The air of the storage place near the loading port contains much salt; (3) The inside of the transport ship is high in temperature and humidity; and (4) The total of the storage term in the storage places near the loading and unloading ports and the voyage term to the foreign country may reach several months due to unexpected external factors. When the disc brake rotor is rusted, the degree of rusted state is different between a part of the disc brake rotor to which brake linings are brought into contact and the other part of the same. If the disc brake is operated upon the vehicle running under such a rusted condition, torque fluctuation of the disc brake rotor unavoidably occurs. This is called the 'judder' phenomena and impedes a driver's smooth braking feeling.

In view of the above, it has already been proposed to use rust preventing treatment on a disc brake rotor, in which a corrosion resistance coating such as phosphate is formed on the surface of the disc brake rotor. This is effective for improving corrosion resistance and for decreasing the torque fluctuation of the disc brake rotor. However, such a phosphate coating is relatively soft to obtain the initial concordance between the disc brake rotor and the brake lining in order to secure the coefficient of friction μ therebetween, thus weakening the adhesion of the coating to the surface of the disc brake rotor. Additionally, increasing the thickness of the coating to improve the corrosion resistance lowers the coefficient of friction. In this regard, the thickness of the coating must be as thin as possible within a range of attaining a required corrosion resistance. This results in the possibility that the soft coating is scraped off by a brake lining when a strong brake force is applied, particularly in the case where a so-called semi-metallic brake lining (whose base material is steel fiber) is used in the disc brake. This lowers the corrosion resistance of the disc brake rotor and increases the torque fluctuation of the disc brake rotor during braking of the vehicle. The semi-metallic brake lining is higher in grinding force and recently has become widely used.

SUMMARY OF THE INVENTION

According to an aspect of the present invention, a disc brake consists of a rotor fixedly attached to a member on a side of a road wheel and movably disposed between a pair of friction pads with linings. A nickel coating is formed on the surfaces of the rotor to which surfaces the friction pad linings face, respectively. The nickel coating contains therein ceramic particles in a dispersed state and has a thickness not less than 2 μm.

According to another aspect of the present invention, a method for forming the nickel coating containing the ceramic particles on the surface of the disc brake rotor consists of a step in which ceramic particles are mixed in a plating solution containing ions of nickel or nickel alloy. The rotor is dipped in the plating solution in which the ceramic particles are dispersed, thereby forming a composite plate of nickel and ceramic particles.

The thus formed nickel coating containing the ceramic particles greatly improves wear resistance and corrosion resistance of the disc brake rotor while improving initial concordance with the friction pad linings. Additionally, this nickel coating cannot be readily peeled off even when used in combination with the friction pads with so-called semi-metallic linings, thereby minimizing torque fluctuation of the disc brake rotor during braking.

BRIEF DESCRIPTION OF THE DRAWINGS

The features and advantages of the disc brake according to the present invention will be more clearly appreciated from the following description taken in conjunction with the accompanying drawings in which like reference numerals designate corresponding elements, and in which.

DETAILED DESCRIPTION OF THE INVENTION

According to the present invention, a nickel coating containing ceramic particles in a dispersed state is formed on the surfaces of a rotor or disc of a disc brake, the surfaces being in slidable contact with the friction pads or shoes of the disc brake.

A method of forming the nickel coating containing ceramic particles will be discussed hereinafter. The process of this method includes, in the following order, cleaning, degreasing, rinsing, pickling, rinsing, electroplating or composite plating, rinsing, and rust preventing treatment. In the electroplating step, ceramic particles made of SiC, BN, $Si_3N_4$ and/or the like are mixed with or dispersed in a solution containing ions of nickel or nickel alloy to form a plating bath. The amount of the ceramic particles mixed with the solution is 20 to 200 g/l, preferably 80 to 120 g/l. An electroplating is made using this mixed solution in which a member or disc brake rotor to be plated is dipped. It is to be noted that if the amount of ceramic particles is less than 20 g/l, the ceramic particles cannot be sufficiently dispersed thereby making uniform coating impossible. If the amount of the ceramic particles exceeds 200 g/l, the concentration of ceramic particles in the plating solution is too high so that a large amount of the ceramic particles cannot be uniformly mixed with the solution and are wasted. The particle or grain size of each ceramic particle is sufficient if it is smaller than the thickness of the nickel coating. However, it is preferable that the particle size is not smaller than 0.1 $\mu$m because agglomeration of the ceramic particles may occur if the particle size is too small.

Figure 3A:
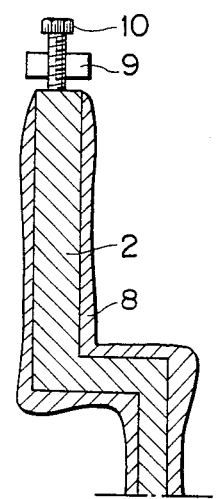
FIG. 3A is a cross-sectional view of a part of a disc brake rotor, showing the state of a coating formed on the surface of the disc brake rotor by electroplating in the case where a jig for preventing so-called coating trumpet formation is installed around the disc brake rotor during the electroplating.
Figure 3B:
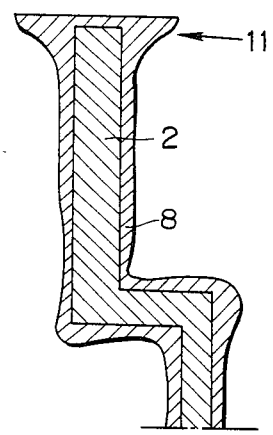
FIG. 3B is a cross-sectional view similar to FIG. 3A but showing the state of a coating formed on the surface of a disc brake rotor by electroplating in case where no jig is used during the electroplating.

The electroplating or composite plating can be accomplished using a usual electroplating apparatus. However, if the disc brake rotor is dipped as it is in the plating bath to accomplish an electroplating, formation of a so-called coating trumpet 11 may be made as shown in FIG. 3B in which the thickness of the electroplating coating is extremely large at the outer peripheral section of the disc brake rotor and tends to be unstable. As a result, in the case where the friction pad is in slidable contact with the outer peripheral section of the disc brake rotor while the friction pad is still new, torque fluctuation of the disc brake rotor occurs (due to a coating thickness fluctuation) during vehicle braking, thereby producing judder, shimmy and foreign noise.

In this regard, it is preferable to make the thickness of the electroplating coating or composite plate uniform throughout the outer peripheral section and the inner peripheral section of the disc brake rotor thereby to suppress the thickness fluctuation of the electroplating coating formed on the disc brake rotor. In order to do this, an annular jig 9 is fixedly disposed around the outer periphery of the disc brake rotor 2 as shown in FIG. 3A in which the annular jig 9 made of, for example, stainless steel is fixed near the periphery of the rotor 2 by means of bolts 10 in such a manner that the jig is located around and spaced from the rotor outer periphery. When electroplating is made in this state, the electroplating coating is formed also on the jig 9 in addition to on the rotor 2, thus preventing formation of the coating trumpet 11 as shown in FIG. 3B. The jig 9 is removed after completion of the electroplating. The electroplating coating on the jig 9 can be easily removed, sometimes by knocking it from the jig, or by carrying out pickling, so that the jig 9 can be repeatedly used.

Figure 4:
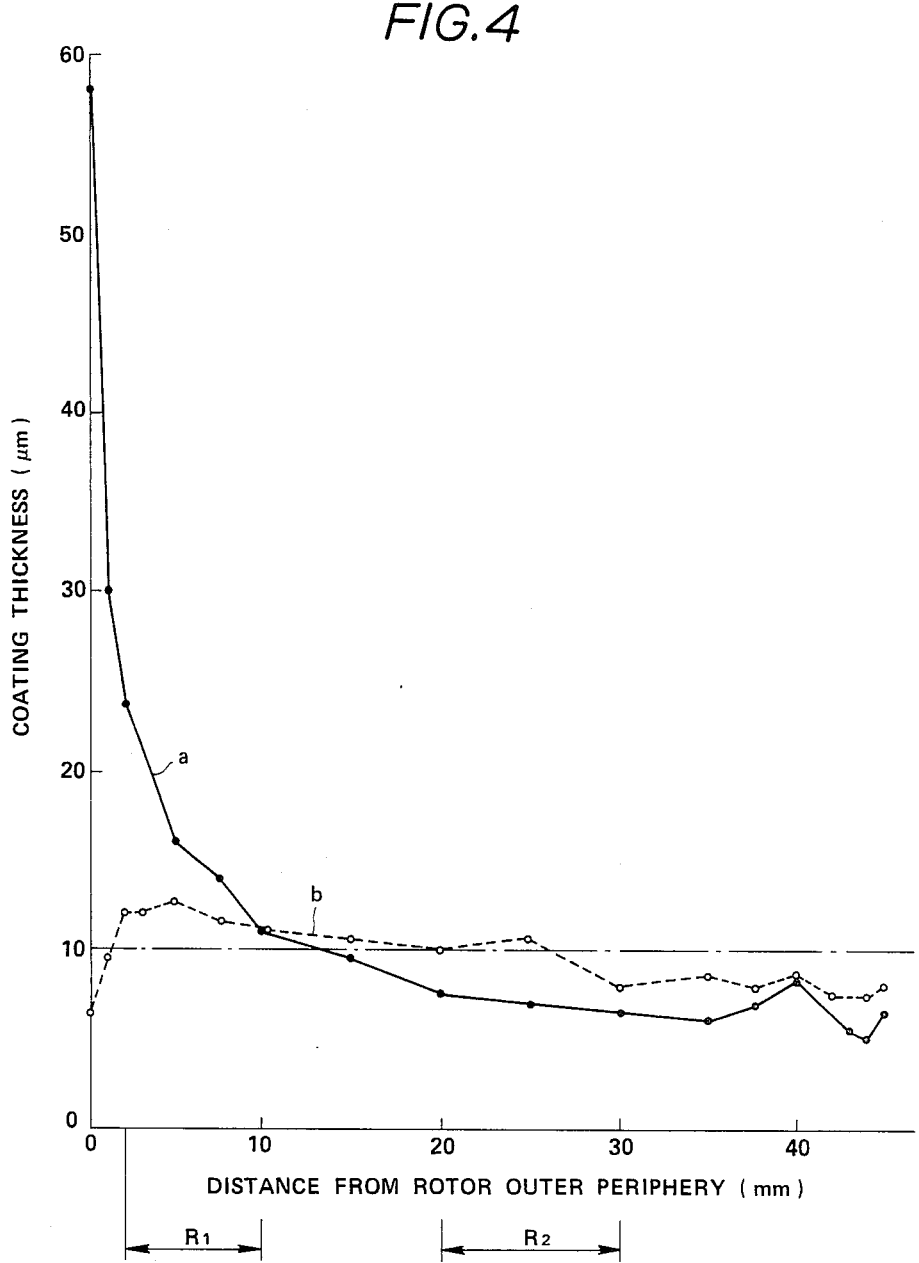
FIG. 4 is a graph showing the relationship between the thickness of a coating and the distance from the outer periphery of a disc brake rotor on which the coating is formed; an FIG. 5 is the fluctuation of thickness of a coating at concyclic points and the distance from the outer periphery of a disc brake rotor on which the coating is formed.

FIG. 4 shows experimental data of the thickness of the electroplating coating formed on the surface of the disc brake rotor 2 in terms of the distance (mm) from the outer periphery of the rotor 2 in the case of usual electroplating (indicated by a line a) where no annular jig was used as shown in FIG. 3B and in the case of electroplating (indicated by a line b) where the annular jig 9 was used to prevent formation of the coating trumpet as shown in FIG. 3A. The data was obtained by carrying out electroplating, setting a target level thickness of the electroplating coating at 10 $\mu$m. In the data of FIG. 4, a range $R_1$ denotes a location where the friction pad is brought into contact with the rotor surface while the friction pad is still new, while a range $R_2$ denotes a location where the friction pad is brought into contact with the rotor surface when a sufficient contact therebetween was obtained.

Figure 5:
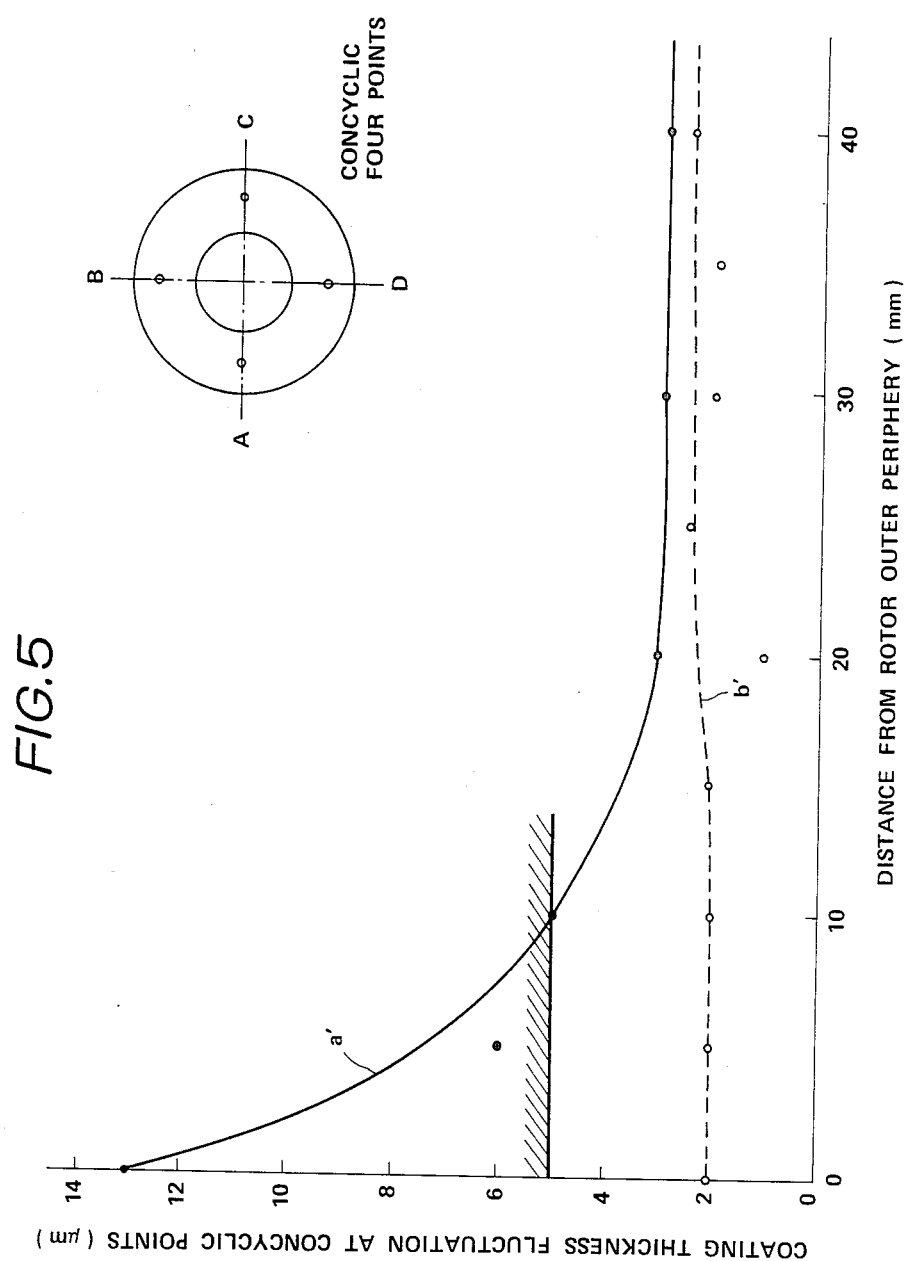

FIG. 5 shows experimental data of the fluctuation (the difference between the maximum and minimum values) of thickness of electroplating coating at four concyclic positions A, B, C and D on the disc brake rotor in terms of the distance (mm) from the outer periphery of the rotor in the case of the usual electroplating (indicated by a line a') where no annular jig was used as shown in FIG. 3B and in the case of the electroplating (indicated by a line b') where the annular jig 9 was used to prevent formation of the coating trumpet as shown in FIG. 3A.

The data of FIGS. 4 and 5 reveal that the coating thickness fluctuation of the case of FIG. 3A is much less both in the radial direction and circumferential direction than the usual or conventional case of FIG. 3B. It is to be noted that judder tends to occur in cases where coating thickness fluctuation in the circumferential direction exceeds 5 $\mu$m. In this regard, it will be understood that electroplating can be accomplished with a coating thickness providing no possibility of causing judder in the case of FIG. 3A where the coating trumpet preventing measure is made.

The present invention will be illustrated in detail hereinafter with reference to FIGS. 1A, 1B and 2 of the drawings.

Figure 1A:
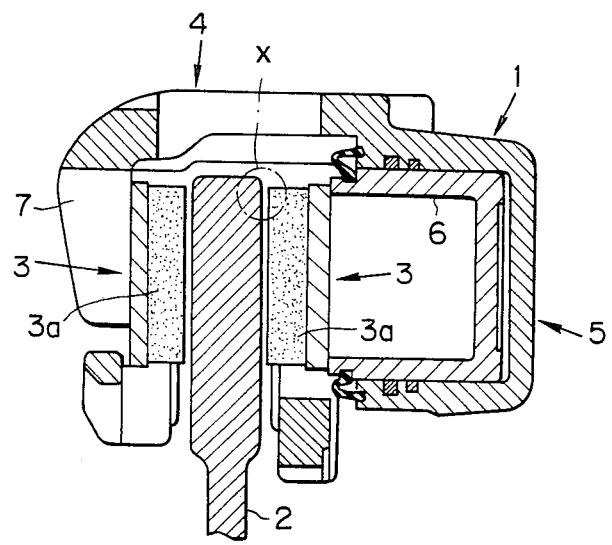
FIG. 1A is a vertical sectional view of an essential part of an embodiment of a disc brake in accordance with the present invention.
Figure 2:
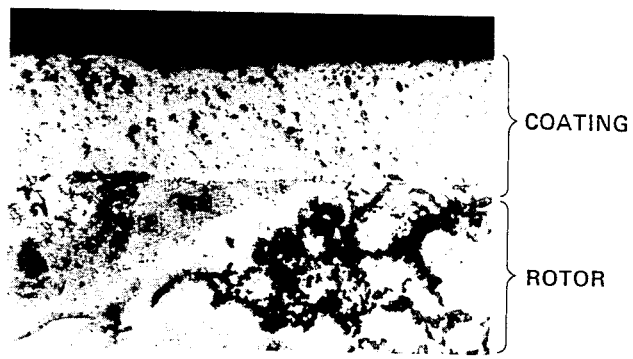
FIG. 2 is a microphotography of a cross-section of a part of a disc brake rotor coated with a nickel coating containing ceramic particles, which coating was formed in accordance with the present invention.

Referring to FIG. 1A there is shown an essential part of a first embodiment of a disc brake in accordance with the present invention. The disc brake 1 comprises the rotor 2 which is secured to a member (not shown) on the side of a road wheel (not shown). The rotor 2 is made of a ferrous metal or alloy and has an axis (not shown) located below a shown part of the rotor 2 in FIG. 1A. The rotor 2 is formed with opposite sliding surfaces near which a pair of friction pads 3, 3 are movably disposed. The friction pads 3, 3 are adapted to be forced against the opposite sliding surfaces of the rotor 2, respectively, during braking. One of the friction pads 3, 3 is fixed to one end of a piston 6 movably disposed inside a cylinder (no numeral). The cylinder forms part of a hydraulic system 5 which is arranged to hydraulically operate the piston 6 leftward in FIG. 1A when braking of the vehicle is required. The friction pad 3 is so fixed to the piston 6 as to be forced against the sliding surface of the rotor 2. The other friction pad 3 is securely attached to an arm 7 of a caliper 4 fixedly connecting to the cylinder of the hydraulic system 5 and so located as to be forced against the sliding surface of the rotor 2. As shown, the friction pads 3, 3 are located in such a manner that the rotor 2 is put between the friction pads 3, 3. The caliper 4 is securely supported on a vehicle body (not shown). Each friction pad 3 is provided with a brake lining 3a which is contactable with the sliding surface of the rotor 2. Accordingly, when the disc brake 1 is not operated, in which no fluid pressure is applied to the piston 6, the oppositely disposed friction pad brake linings 2, 2 are spaced from the respective sliding surfaces of the rotor 2 by an approximately equivalent distance. On the contrary, when the disc brake 1 is operated, in which a fluid pressure is applied to the cylinder 6 under the action of the hydraulic system 5, the oppositely disposed friction pad brake liings 3a, 3a are brought into contact with or forced against the sliding surfaces of the rotor 2 under an equivalent pressure in such a manner that the rotor 2 is put between the linings 3a, 3a, thereby braking the wheel of the vehicle and accordingly braking the vehicle.

Figure 1B:
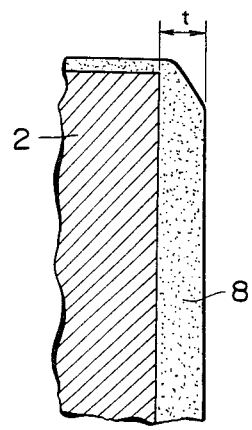
FIG. 1B is an enlarged sectional view of a part enclosed by a circle X in FIG. 1A.

As illustrated in FIG. 1B the nickel coating 8 by the electroplating is formed on the surface of the rotor 2. The ceramic particles are dispersed in the nickel coating 8. This will be apparent from FIG. 2 showing a microphotograph taken under 520 magnifications. The thickness t of the nickel coating 8 is not less than 2 μm because if less than 2 μm, a part of the coating may be scraped off under sliding contact with the brake lining 3a so as to be subjected to corrosion. It is to be noted that the upper limit of the nickel coating thickness is sufficient if it is 10 μm, taking account of obtaining a sufficient initial rust prevention.

In order to demonstrate the effect of the above-discussed composite plating of the nickel and ceramic particles, experiments were conducted in which torque fluctuation of the disc brake rotor after being subjected to a corrosion test was measured with respect to sample disc brake rotors which had been prepared by making a variety of treatments thereon, respectively, the rotor being made of a ferrous metal or alloy (so-called FCA material). The results of the experiments are shown in Table 1. The corrosion test was conducted as follows: Brackish water was sprayed onto a sample disc brake rotor. Next, the opposite side surfaces of the sample disc brake rotor were subjected to 12 cycles of corrosion treatments after being dried at 60° C. for 59 minutes, each cycle of the corrosion treatment consisting of a step of keeping the sample disc brake rotor in a moist atmosphere having a relative humidity of 95% at 50° C. for 3 hours. Friction pads of a disc brake used in the experiments are provided with so-called semi-metallic linings (trade name 'HP 12' of Hitachi Chemical Co., Ltd.), respectively. The semi-metallic lining contains steel fiber as the base material, and solid-lubricant (such as graphite) and metal powder as the friction and wear conditioners.

TABLE 1

| Sample No. | Treatment | Coating thickness (μm) | Coefficient of friction (μ) | Torque fluctuation after corrosion (Kg · m) | Result |
|---|---|---|---|---|---|
| 1 | Zinc phosphate treatment | 4–8 | 0.27–0.42 | 4.5–6.0 | Larger torque fluctuation, rejected |
| 2 | Manganese phosphate treatment | 9.5 | 0.25–0.44 | 4.5–6.0 | Larger torque fluctuation, rejected |
| 3 | Iron phosphate treatment | 3.1 | 0.38–0.52 | 5.0–8.0 | Larger torque fluctuation, rejected |
| 4 | Zinc calcium phosphate treatment | 4.6 | 0.35–0.48 | 3.5–5.0 | Larger torque fluctuation, rejected |
| 5 | Blackening treatment | 0.1–0.3 | 0.21–0.37 | Not smaller than 0.8 | Larger torque fluctuation, rejected |
| 6 | Tufftride treatment | 10 | 0.24–0.44 | Not smaller than 9.0 | Larger torque fluctuation, rejected |
| 7 | Solid lubricant treatment | 2–5 | 0.16–0.29 | 3.0–4.0 | Lower coefficient of friction, rejected |
| 8 | Zinc and chromic acid coating formation treatment | 4 | 0.18–0.56 | 2.0–6.0 | Larger torque fluctuation, rejected |
| 9 | Zinc plating | 7 | 0.27 | — | Coating peeled off, rejected |
| 10 | Nickel plating | 5 | 0.27–0.63 | — | Unstable coefficient of friction, rejected |
| 11 | Copper plating | — | — | — | Coating peeled off, rejected |
| 12 | Composite plating | 5 | Not lower than 0.2 | 2.0–4.0 | Accepted |
| 13 | Wax and rust preventing oil treatment | 4–5 | Not higher than 0.1 | — | Lower coefficient of friction, rejected |

The sample disc brake rotors of Sample Nos. 1 to 13 shown in Table 1 were subjected to the following treatments, respectively, prior to the experiments.

Sample No. 1: Zinc phosphate treatment corresponds to 'parkerizing #210' treatment of Nihon Parkerizing Co., Ltd. The zinc phopphate treatment was carried out onto the sample disc brake rotor as follows: Degreasing was made by putting the sample disc brake rotor in a degreasing agent (trade name 'FC-4360' of Nihon Parkerizing Co., Ltd.) at 50 to 70° C. for 10 minutes. Next, pickling was made by putting the sample disc brake rotor in a HCl solution having a concentration of 10 to 20% at room temperature for 0.5 minute after rinsing with water at room temperature for 0.5 minute. Thereafter, surface conditioning was made by putting the sample disc brake rotor in a surface conditioning agent (trade name 'PN-N' of Nihon Parkerizing Co., Ltd.) at room temperature for 0.5 minute, after rinsing with water at room temperature for 0.5 minute. Next, coating formation was carried out by putting the sample disc brake rotor in a coating formation agent (trade name 'PR-210' of Nihon Parkerizing Co., Ltd.) at 95° to 99° C., thus forming a zinc phosphate compound layer on the surface of the sample disc brake rotor. Thereafter, rising was made with hot water at 80° C. for 0.5 minute after rising with water at room temperature.

Sample No. 2: Manganese phosphate treatment was similar to the above-mentioned zinc phosphate treatment with the exception that a coating formation agent (trade name 'BT5004' of Nihon Parkerizing Co., Ltd.) was used in place of trade name 'PR-210'.

Sample No. 3: Iron phosphate treatment was similar to the above-mentioned zinc phosphate treatment with the exception that a coating formation agent (trade name 'TD338' of Nihon Parkerizing Co., Ltd.) was used in place of trade name 'PR-210'.

Sample No. 4: Zinc calcium phosphate treatment was similar to the above-mentioned zinc phosphate treatment with the exception that a coating formation agent (trade name 'BT880' of Nihon Parkerizing Co., Ltd.) was used in place of trade name 'PR-210'.

Sample No. 5: Blacking treatment was made by forming a coating of tri-iron tetroxide ($Fe_3O_4$) on the surface of the sample disc brake rotor upon using strong alkaline colorant, thus accomplishing a shining and graceful black finish onto the sample disc brake rotor.

Sample No. 6: Tufftride treatment was made in a tufftride treatment molten salt bath mainly containing cyanide (MCN) and cyanate (MCNO), thereby forming a layer of $Fe_4N$ on the diffused layer of nitrogen.

Sample No. 7: Solid lubricant treatment was made by dispersing molybdenum disulfide ($MoS_2$) in organic resin to obtain a paint-like treatment agent and thereafter by applying it onto the sample disc brake rotor to form a coating of the solid lubricant on the surface of the rotor.

Sample No. 8: Zinc and chromic acid coating formation treatment was made as follows: a treatment agent containing metallic zinc (25%), reducing agent glycol (15%), chromic acid anhydride (5.5%) and water (52%) was applied onto the surface of the sample disc brake rotor. Thereafter, the sample disc brake rotor was heated in a furnace to have a surface temperature of 320° C. for about 25 minutes, so that zinc was formed as a plate-type layer on the surface of the sample disc brake rotor in which chromic acid was lying therebetween serving as an adhesive thereby to form a complete coating.

Sample Nos. 9 to 11: zinc plating, nickel plating, and copper plating were usual electroplatings, respectively.

Sample No. 12: Composite plating was a treatment according to the present invention in which a corrosion resistance nickel coating containing ceramic particles was formed on the surface of the sample disc brake rotor. The composite plating was accomplished by dipping the sample disc brake rotor in a plating bath of nickel sulfamate in which the ceramic particles of SiC were dispersed, after being subjected to a series of pretreatments of rinsing with water, degreasing, rinsing with water, pickling, and rinsing with water.

Sample No. 13: Wax or rust preventing oil treatment was done by applying wax or rust preventing oil (trade name 'Nap-Rust #4678' of Nihon Parkerizing Co., Ltd.) onto the surface of the sample disc brake rotor.

It is to be noted that a disc brake rotor generally requires a coefficient of friction ($\mu$) of not less than 0.2. It is also noted that the judder phenomena during brake application tends to occur when the torque fluctuation of the disc brake rotor exceeds a level of about 4 kg.m, and therefore the judder phenomena can be prevented by suppressing the torque fluctuation below that level. The torque fluctuation after the corrosion test was measured as follows: 50 braking operations were made using a disc brake provided with the sample disc brake rotor in such a manner as to make a deceleration of 0.3 G at a vehicle speed of 50 Km/hr. Thereafter, the sample disc brake rotor was subjected to the above-mentioned corrosion test. Next, a braking operation similar to the above was again made, measuring torque fluctuation of the disc brake rotor during braking.

In addition, the torque fluctuation of five sample disc brake rotors during braking was measured after corrosion and is shown in Table 2, carrying out five tests (Test Nos. 1 to 5). Each test was conducted as follows: 50 braking operations were made using a disc brake provided with the sample disc brake rotor in such a manner as to make a deceleration of 0.3 G at a vehicle speed of 50 Km/hr. Next, the sample disc brake rotor was allowed to stand six months on the sea coast. Thereafter, the torque fluctuation of the sample disc brake rotor was measured when a braking operation similar to the above was made. As shown in Table 2, torque fluctuation measurement of test No. 1 was made on the sample disc brake rotor to which no treatment had been made, using a friction pad with a so-called asbestos lining (trade name 'NP01' of Nisshinbo Industries, Inc.) and a friction pad with a semi-metallic lining. The asbestos lining contains asbestos as the base material. The measurement of test No. 2 was made on the sample disc brake rotor to which the zinc phosphate treatment had been made, using friction pads with the asbestos linings. The measurement of Sample No. 3 was made on the sample disc brake rotor to which the zinc phosphate treatment had been made, using friction pads with the semi-metallic linings. The measurement of Sample No. 4 was made on the sample disc brake rotor to which the zinc and chromic acid coating formation treatment had been made, using friction pads with the semi-metallic linings. The measurement of Sample No. 5 was made on the sample disc brake rotor to which the composite plating had been made, using friction pads with the semi-metallic linings. The various treatments in the Test Nos. 2 to 5 are the same in the experiments of Table 1.

TABLE 2

| Test No. | Rotor | Lining | Torque fluctuation (kg · m) after time lapse of 6 months 2 4 6 8 10 12 |
|---|---|---|---|
| 1 | No treatment | Asbestos lining Semi-metallic lining | |
| 2 | Zinc phosphate treatment | Asbestos lining | |
| 3 | Zinc phosphate treatment | Semi-metallic lining | |
| 4 | Zinc and chromic acid coating formation treatment | Semi-metallic lining | |
| 5 | Composite plating | Semi-metallic lining | |

The test result shown in Table 2 demonstrates that the rust prevention treatments are effective for suppressing judder phenomena, in which the composite plating is the most effective for the same purpose.

As is appreciated from the above, according to the present invention, the disc brake rotor is coated at its sliding surface with a nickel coating which contains ceramic particles in dispersed state and has a thickness not less than 2 $\mu$m. The nickel coating has a coefficient of friction larger than a required value of 0.2 and therefore exhibits a sufficient braking force. Additionally, the nickel coating cannot be readily scraped off even by the semi-metallic brake lining which is higher in grinding force during braking, while improving corrosion resistance of the disc brake rotor. Accordingly, by virtue of the nickel coating of the present invention, rust can be effectively prevented from being fomed on the surface of the disc brake rotor for a very long time including a vehicle storage term such as from the production of the vehicle to the delivery of the same to the customer, while suppressing the torque fluctuation of the disc brake rotor during braking to an allowable low level.

What is claimed is:

1. A method for forming a corrosion resistance coating on the surface of a rotor of a disc brake, comprising the steps of:
    mixing ceramic particles in a plating solution containing ions of nickel, wherein said amount of ceramic particles is within a range from 80 to 120 g per liter of said plating solution;
    surrounding outer periphery of said rotor with an annular metal jig;
    passing said rotor and said metal jig through said plating solution mixed with said ceramic particles to accomplish electroplating of nickel and ceramic particles on the surfaces of said rotor and said metal jig so that corrosion resistance coating of said rotor is obtained.

2. A method as claimed in claim 1, wherein each ceramic particle is made of at least one selected from the group consisting of SiC, BN and $Si_3N_4$.

3. A method as claimed in claim 1, wherein each ceramic particle has a particle size not smaller than 0.1 $\mu$m.

4. A method as claimed in claim 1, wherein each ceramic particle has a particle size smaller than the thickness of said corrosion resistant coating.

5. A method for forming a corrosion resistance coating on the surface of a rotor of a disc brake, comprising the steps of:
    mixing ceramic particles in a plating solution containing ions of nickel;
    surrounding outer periphery of said rotor with an annular metal jig attached to the outer periphery of said rotor;
    passing said rotor and said metal jig through said plating solution mixed with said ceramic particles to accomplish electroplating of nickel and ceramic particles on the surfaces of said rotor and said metal jig so that corrosion resistance coating of said rotor is obtained.

6. A method as claimed in claim 5, wherein each ceramic particle is made of at least one selected from the group consisting of SiC, BN, and $Si_3N_4$.

7. A method as claimed in claim 5, wherein each ceramic particle has a particle size not smaller than 0.1 $\mu$m.

8. A method as claimed in claim 5, wherein said annular metal jig is made of stainless steel.

9. A method as claimed in claim 5, wherein said annular metal jig is disposed coaxial with said rotor and spaced from the outer periphery of said rotor.

10. A method as claimed in claim 5, wherein said rotor is made of a ferrous alloy.

11. A method as claimed in claim 5, wherein each ceramic particle has a particle size smaller than thickness of said corrosion resistance coating.

12. A method as claimed in claim 11, wherein said particle size is not less than 0.1 $\mu$m.

* * * * *